United States Patent [19]

Masuda et al.

[11] Patent Number: 4,830,428
[45] Date of Patent: May 16, 1989

[54] SUN-ROOF STRUCTURE OF A VEHICLE BODY

[75] Inventors: Mitsuyoshi Masuda, Nagoya; Kenichi Fukura, Toyota; Katsuaki Kadoike, Toyoake; Kazuhiro Nishikawa, Toyota, all of Japan

[73] Assignees: Aisin Seiki Kabushiki Kaisha; Aisin Keikinzoku Kabushiki Kaisha, both of Japan

[21] Appl. No.: 195,893

[22] Filed: May 19, 1988

[30] Foreign Application Priority Data

May 22, 1987 [JP] Japan ................. 62-123657

[51] Int. Cl.[4] ............ B60J 7/047; B60J 7/12; B60J 7/14
[52] U.S. Cl. .................... 296/219; 296/220
[58] Field of Search ........... 296/216, 217, 219, 220, 296/222

[56] References Cited

U.S. PATENT DOCUMENTS 3,964,783  6/1976  Fisher .................. 296/219

FOREIGN PATENT DOCUMENTS 570745  12/1957  Italy ................... 296/219
12529   1/1987   Japan .
201483  11/1938  Switzerland .......... 296/219

Primary Examiner—Dennis H. Pedder
Attorney, Agent, or Firm—Finnegan, Henderson, Farabow, Garrett & Dunner

[57] ABSTRACT

A sun-roof structure of a vehicle body including a retractable roof panel assembly which is comprised of a rigid front panel and a foldable hood. Guide grooves and link mechanism are provided so that the front panel is laid over the folded hood in the retracted position of the sun-roof so as to cover the folded hood.

6 Claims, 7 Drawing Sheets

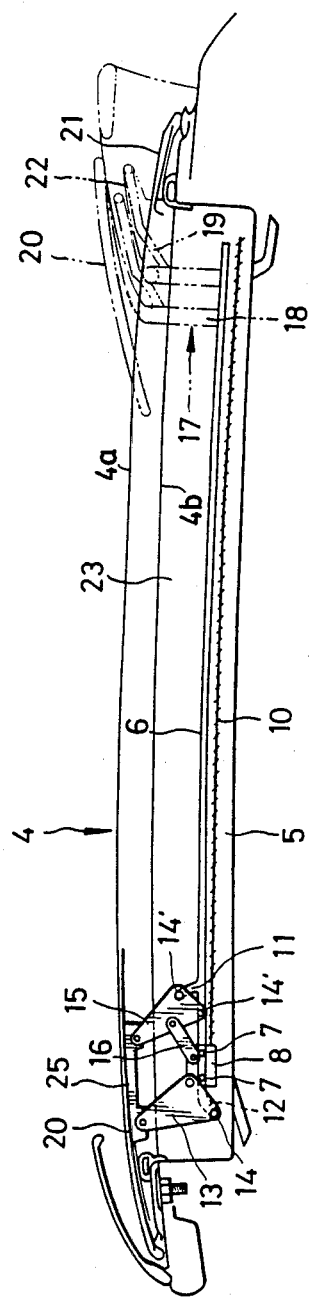
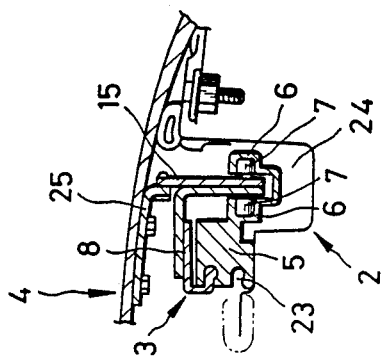

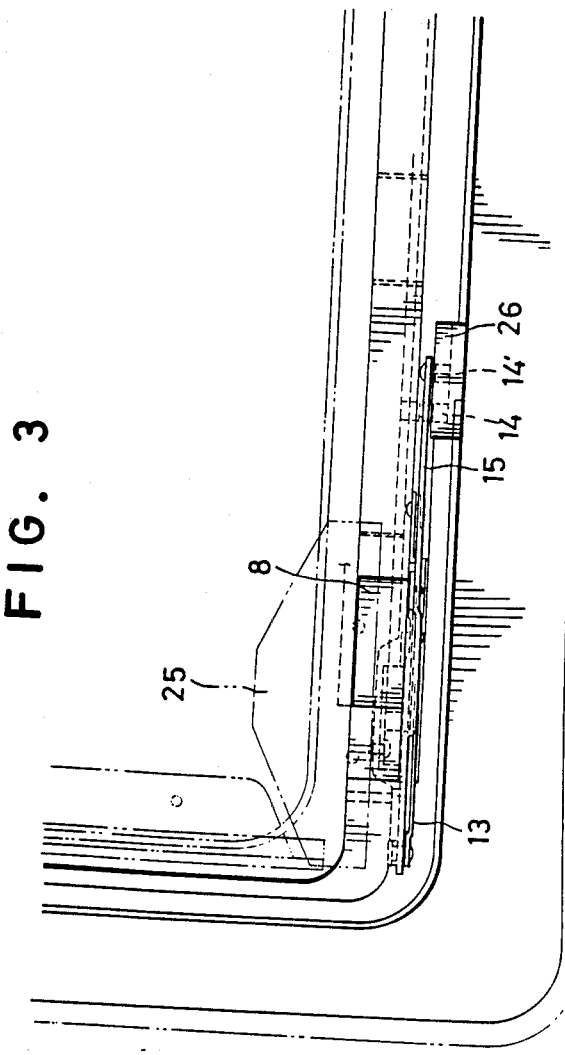
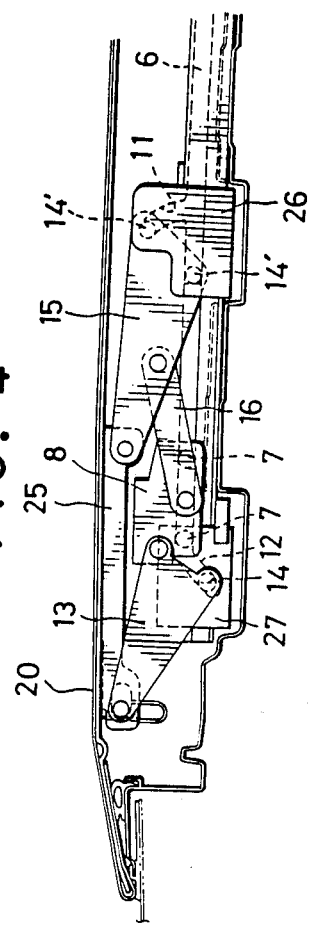

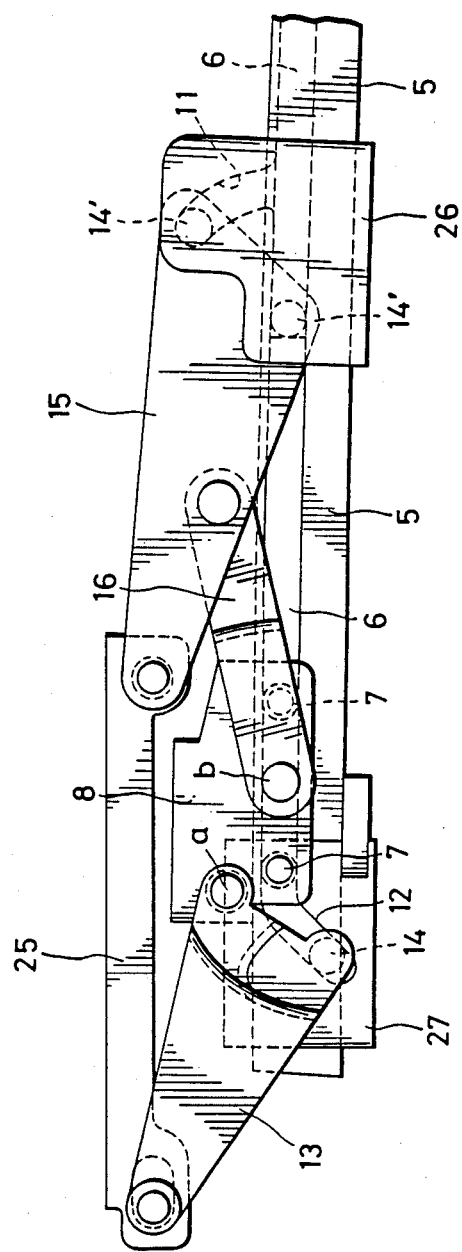

SUN-ROOF STRUCTURE OF A VEHICLE BODY

BACKGROUND OF THE INVENTION

1. Field of the Invention

The present invention relates to vehicle body structures and more particularly to sun-roof structures of vehicle bodies. More specifically, the present invention pertains to a sun-roof structure having a foldable hood.

2. Description of the Prior Art

Known vehicle body structures include a so-called sun-roof which comprises a roof opening formed in a vehicle body roof structure and a foldable hood made for example of a canvas material and movable between a closed position wherein it is extended to cover the opening and a folded position wherein it is folded to open the opening in the roof structure. One example of such sun-roof structure is disclosed by the Japanese utility model disclosure 62-12529. In the structure shown by the Japanese utility model, guide rails are arranged along the opposite sides of the opening in the roof structure. The foldable hood made of a canvas material is provided with shoes which are adapted to slide along the guide rails. At the rear edge portion of tee roof opening, there is provided a hood cover wherein the foldable hood is to be retracted. The hood can be moved to the retracted position manually or by means of an electric motor through cable mechanisms which are connected with the sliding shoes to pull the shoes rearward so that the hood is folded and retracted into the cover. After the hood is retracted into the cover, the entrance opening of the cover is manually closed.

The sun-roof structure as disclosed by the Japanese utility model is however disadvantageous in that it requires the aforementioned cover for retracting the folded hood as well as a closure for closing the entrance of the cover with the result that an increased number of parts are required. It should further be noted that operations of the cover closure are always required whenever the hood is operated.

SUMMARY OF THE INVENTION

It is therefore an object of the present invention to provide a sun-roof structure in which operations can be simplified.

Another object of the present invention to provide a sun-roof structure of a vehicle body in which the aforementioned disadvantages can be overcome.

According to the present invention, the above and other objects can be accomplished by a sun-roof structure of a vehicle body including a roof panel formed with an opening, guide rail means provided along the opposite sides of the opening to extend in a fore-and-aft direction, retractable panel means having a rigid front panel means and a foldable hood connected at a front edge portion with a rear edge portion of the rigid front panel, slidable shoe means provided on the retractable panel means and engaged with said guide rail means to slide along said guide rail means so that the retractable panel means is moved between an extended position wherein it covers the opening in the roof panel and a retracted position wherein it is retracted to expose said opening in the roof panel, said foldable hood being folded in said retracted position, means for placing the rigid front panel above said foldable hood in sad retracted position so that the hood is covered by said rigid panel.

According to the features of the present invention, the rigid panel in the retractable panel means is placed to cover the folded hood in the retracted position. Therefore, it is not required to provide a cover just for the purpose of covering the folded hood. The means for placing the rigid front panel above the foldable hood may be constituted by guide grooves for appropriately determining the position of the rigid front panel.

The above and other objects and features of the present invention will become apparent from the following description of a preferred embodiment taking reference to the accompanying drawings.

BRIEF DESCRIPTION OF THE DRAWINGS

FIG. 2 is a side view of the sun-roof structure shown in FIG. 1;

FIG. 3 is a fragmentary plan view of the sun-roof structure;

FIG. 4 is a vertical sectional view of the sun-roof structure in the closed or extended position;

FIG. 5 is a sectional view showing the sectional configuration of the guide rail;

FIG. 6 is a fragmentary side view showing the position of the linkage in the extended position;

DESCRIPTION OF THE PREFERRED EMBODIMENT

Figure 1:
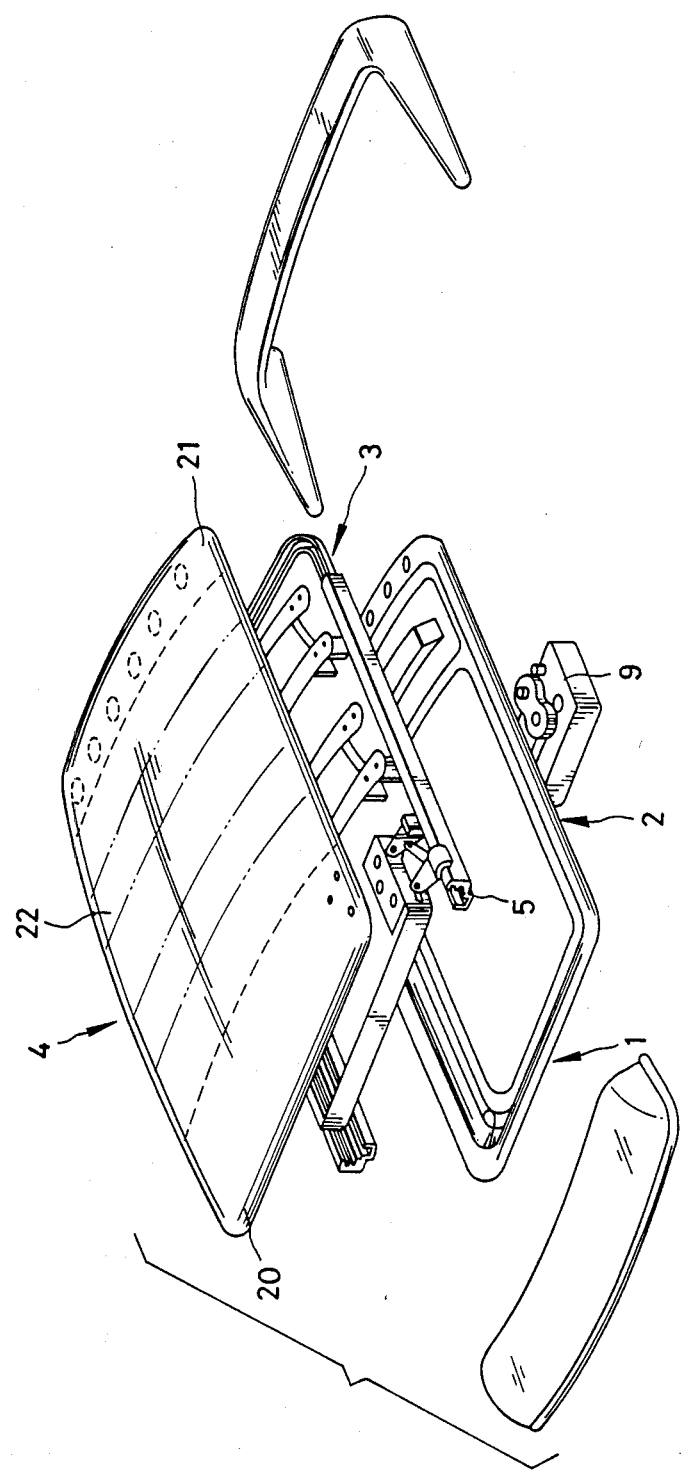
FIG. 1 is an exploded perspective view of a sun-roof structure in accordance with one embodiment of the present invention.
Figure 7:
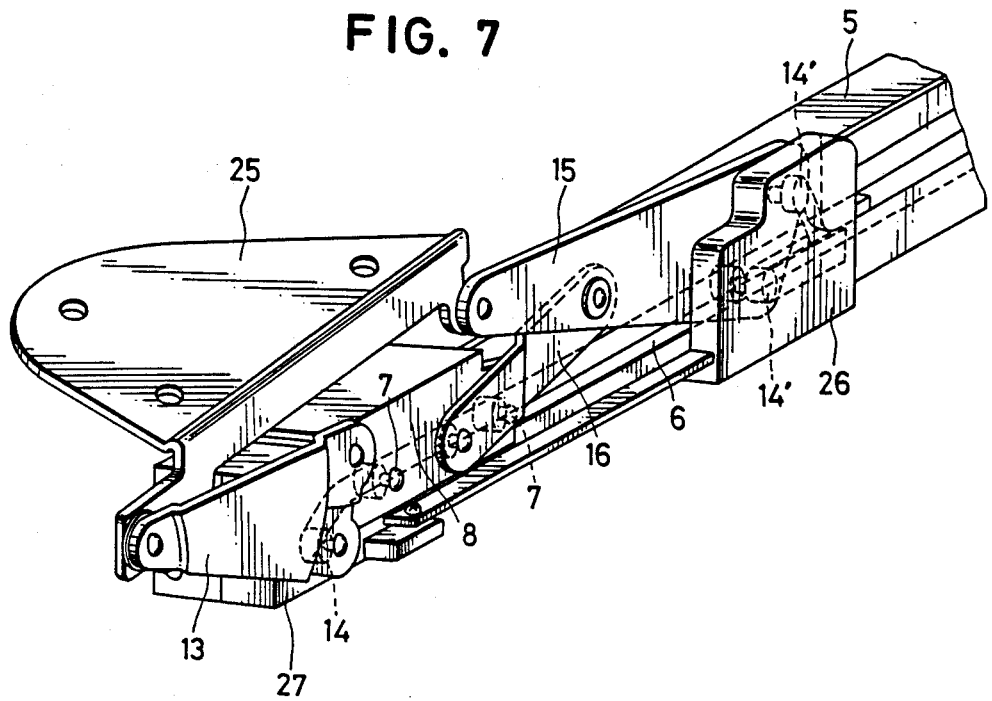
FIG. 7 is a perspective view of the mechanism shown in FIG. 6.
Figure 10:
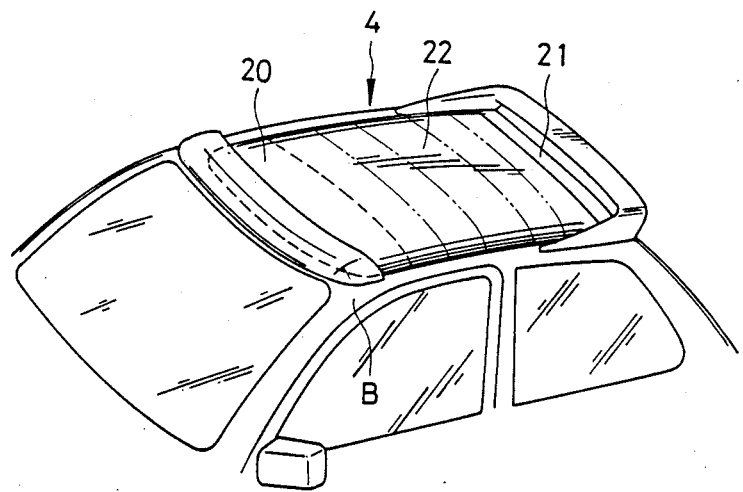
FIG. 10 is a perspective view of the sun-roof structure in the extended position.
Figure 11:
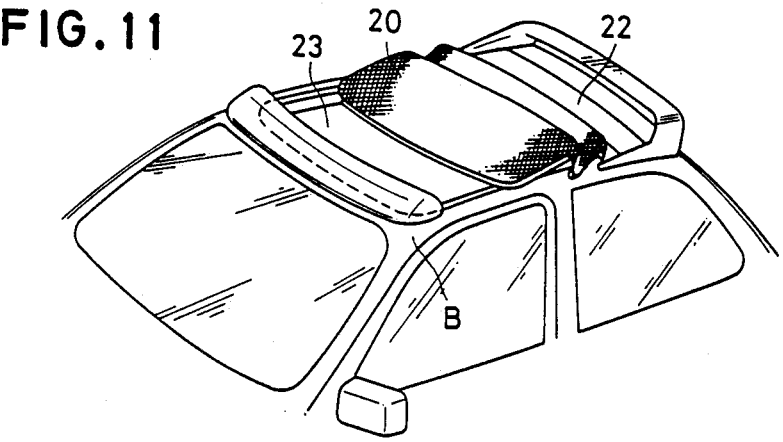
FIG. 11 is a perspective view of the sun-roof structure in a partly opened position; and, FIG. 12 is a perspective view of the sun-roof structure in a retracted position.

Referring to the drawings, particularly to FIG. 1, there is shown a vehicle body sun-roof structure 1 which includes a housing 2 carrying a guide rail assembly 3 and a retractable panel assembly 4 adapted to be slidably moved along the guide rail assembly 3. The housing 2 is mounted on the vehicle body which is designated in FIGS. 10 through 12 by the reference character B and defines a roof opening 23 as clearly shown in FIG. 12.

The guide rail assembly 3 includes a pair of guide rails 5 which extend along the opposite sides of the housing 2. The guide rail 5 is of a cross-sectional configuration as shown in FIG. 5 and is formed with a longitudinally extending first groove 6 as shown in FIGS. 2 and 5. At each side, a shoe assembly 8 is provided for slidable movement along the guide rail 5. For the purpose, the shoe assembly 8 is provided with first rollers 7 which are engaged with the first groove 6. The shoe assembly 8 is connected with one end of a cable 10 which is connected at the other end with a driving mechanism such as a motor 9. As shown in FIG. 2, the groove 6 is curved downwardly at the front end to form a curved groove portion 1.. Further, at a portion rearwardly spaced from the front end, the groove 6 is formed with a branch groove 11 which extends upwardly toward forward from the groove 6.

The retractable panel assembly 4 includes, a rigid front panel 20, having an exterior surface 20a and an interior surface 20b, and a rigid rear panel 21 which are connected together by a foldable hood 22. The shoe assembly 8 has a first link 13 which is of a triangular shape pivotably mounted at one corner on the shoe assembly 8 and carries at a second corner a second roller 14 engaged with the groove 6. The third corner of the first link 13 is pivotably connected with the rigid front panel 20 through a bracket 25. As shown in FIG. 2, when the shoe assembly 8 is in the forwardmost position, the roller 14 engages the curved groove portion 12. A second link 15 of a triangular shape is provided and has at two corners a pair of second rollers 14' which are engaged with the groove 6. The link 15 is mounted at a third corner on the bracket 25 provided on the rigid panel 20 of the retractable panel assembly 4. The second link 15 is connected with the shoe assembly 8 through a link 16. As shown in FIG. 2, one of the rollers 14' is engaged with the branch groove 11 when the shoe assembly 8 is in the forwardmost position. A plurality of follower shoe assemblies 17 are provided. Each of the follower shoe assemblies 17 includes a vertical rod 18 having a lower end portion slidably engaged with the groove 6 and a lateral rod 19 which is pivotably connected with the vertical rod 18. The rods 18 and 19 are connected with the foldable hood 22.

Figure 12:
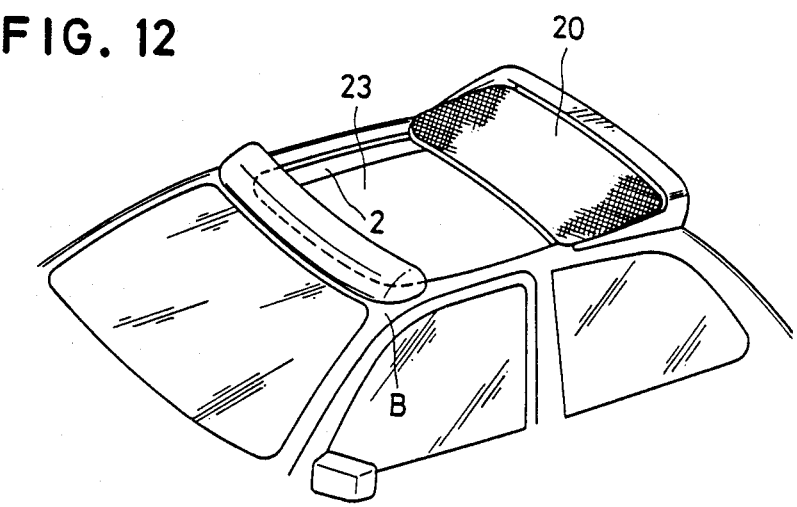

The rigid rear panel 21 of the retractable panel assembly 4 is secured to the housing 2 of the structure 1. In the extended position shown in FIGS. 2 and 10, the motor 9 is operated to move the panel assembly 4 to the retracted position as shown in FIG. 12. The operation of the motor 9 pulls the cable 10 to move the shoe assembly 8 rearward. As the shoe assembly 8 is thus moved rearward, the first roller 14 is moved out of the curved groove portion 12 and the second roller 14' is moved out of the branch groove 11. As the result, the front panel 20 is tilted downward toward forward and the front panel 20 is slidably moved rearward maintaining the tilted position. The foldable hood 22 is folded as shown by phantom lines in FIG. 2. The rigid front panel 20 is laid over the folded hood 22. In the retracted position, the hood is thus covered by the front panel 20 as shown in FIG. 12. Therefore, it is not necessary to provide a cover for covering the folded hood.

Referring to FIG. 5, it will be noted that the guide rail 5 has a pair of grooves 23 formed at the laterally inner side of the rail 5. At the laterally outside, the guide rail 5 is formed with a lateral extension where the grooves 6 are formed in an opposed relationship. The guide rail 5 is secured to the housing 2 which has a recess 24 where the extension having the grooves 6 is received. The shoe assembly 8 includes a member of an inverted L-shaped cross-section having a vertical leg carrying the first rollers 7 which are engaged with the first grooves 6.

Figure 8:
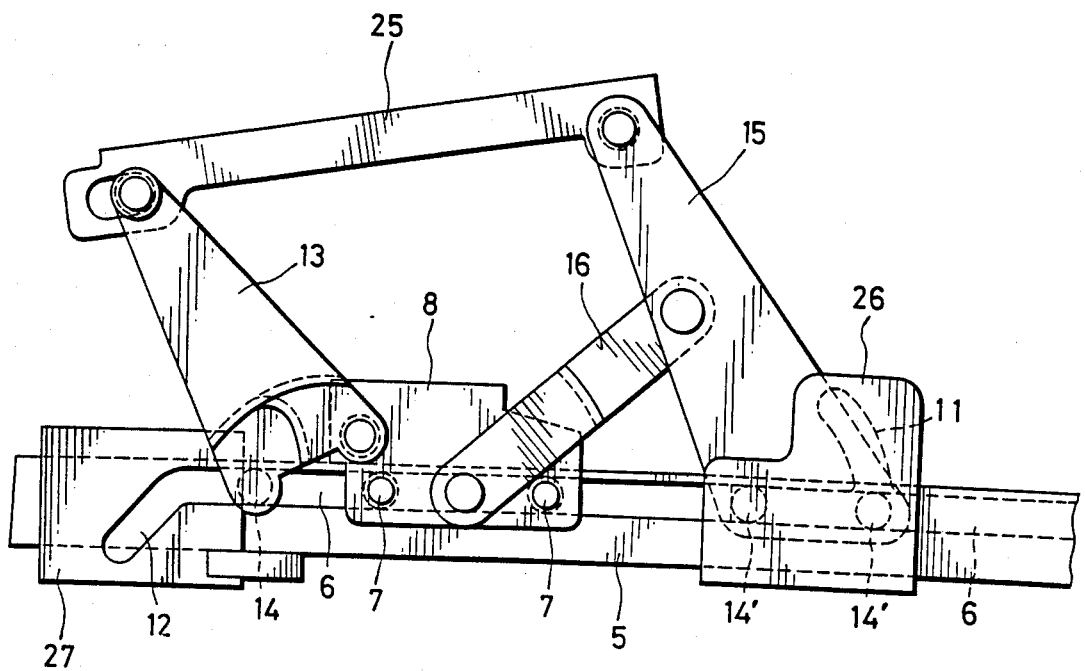
FIG. 8 is a side view showing the operation of the linkage.
Figure 9:
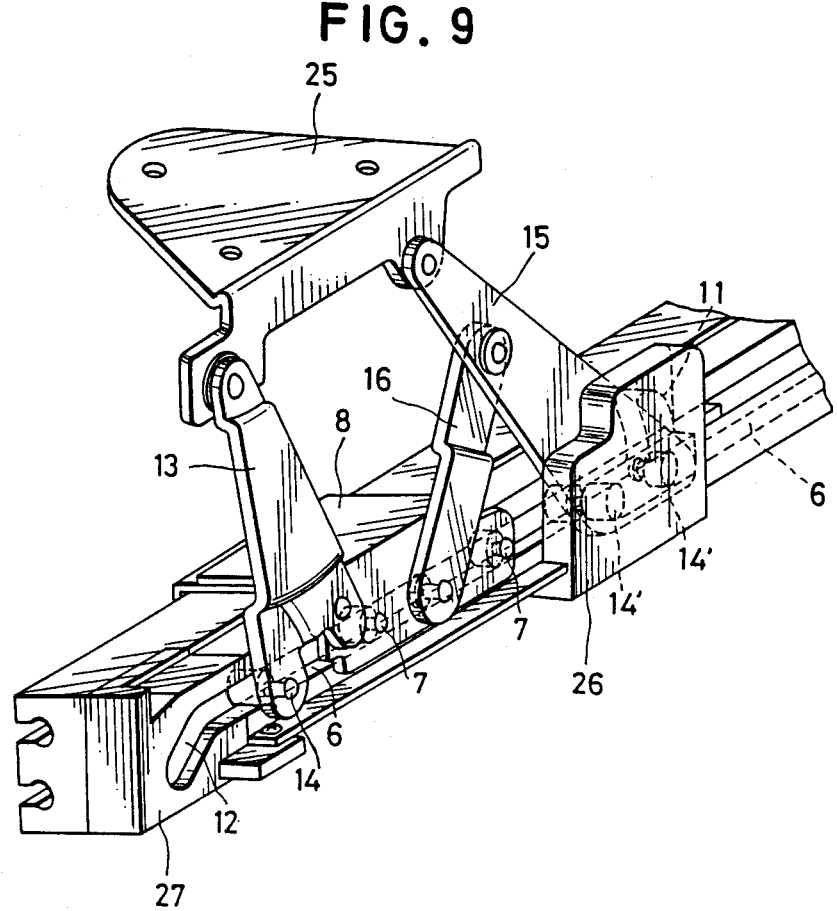
FIG. 9 is a perspective view of the linkage in the position shown in FIG. 8.

The extension of the guide rail 5 is removed at the front end portion and a first bracket 27 and a second bracket 26 ar provided on the guide rail 5 at the portion where the extension of the guide rail 5 is removed. As shown in Figure 4, the bracket 16 is located adjacent to the front edge of the extension of the guide rail 5 and the bracket 27 is located forward of the second bracket 26. The curved groove portion 12 is formed in the first bracket 27. In FIG. 6, it will be noted that, when the shoe assembly 8 is moved rearward, the first link 13 is pivotably moved about the pivot axis a on the shoe assembly 8 in the clockwise direction to lift the front edge portion of the bracket 25. At the same time, the front edge portion of the bracket 25 is moved rearward causing the roller 14' slide out of the branch groove 11. Thus, the link 15 is erected as shown in Figures 8 and 9 to cause the rigid front panel 20 to tilt downward toward forward. It is therefore possible to bring the front panel 20 to a position where the front panel covers the folded hood 22. It will be understood that in accordance with the present invention the angle of tilt of the front panel in the retracted position can be determined appropriately by determining the angle of the branch groove 11 and the configuration of the curved groove portion 12.

The invention has thus been shown and described with reference to a specific embodiment, however, it should be noted that the invention is in no way limited to the details of the illustrated structures but changes and modifications may be made without departing from the scope of the appended claims.

We claim:

1. A sun-roof structure of a vehicle body including a roof panel formed with an opening, guide rail means provided along the opposite sides of the opening to extend in a fore-and-aft direction, retractable panel means having a rigid front panel means with an exterior and an interior surface an a foldable hood connected at a front edge portion with a rear edge portion of the rigid front panel means, slidable shoe means provided on the retractable panel means and engaged with said guide rail means to slide along said guide rail means so that the retractable panel means is moved between an extended position wherein it covers the opening in the roof panel and a retracted position wherein it is retracted to expose said opening in the roof panel, said foldable hood being folded in said retracted position, means for placing the rigid front panel means above said foldable hood in said retracted position so that the hood is substantially completely covered by said rigid panel means with said exterior surface above said interior surface in both extended and retracted positions.

2. The sun-roof structure in accordance with claim 1 in which said placing means includes second groove means continuous with first groove means formed in said guide rail means and follower link means engageable with said second groove means for changing orientation of the rigid roof means between the extended and retracted positions.

3. The sun-roof structure in accordance with claim 2 in which said second groove means includes a front end groove which is oriented downwardly toward a front thereof and a branch groove which is oriented upwardly toward a front thereof, said link means including a first link pivotally connected with said shoe means and said front panel means and carrying first roller means engageable with said front end groove in the extended position so that the first link is pivoted rearward when the first roller means on the first link is moved out of the front end groove, said link means further including a second link pivotally connected with said front panel means and carrying second roller means engageable with said branch groove in the extended position, said second link being pivotally connected with said shoe means so that the links are erected when the shoe means is moved rearward moving the roller means along and out of the front end groove and the branch groove, respectively.

4. The sun-roof structure in accordance with claim 1 in which said retractable panel means includes a rigid rear panel connected with a rear end portion of the hood and adapted to be secured to said roof panel.

5. The sun-roof structure in accordance with claim 2 in which said second groove means is formed in bracket means formed separately from said guide rail means.

6. The sun-roof structure in accordance with claim 3 in which said front end groove is formed in a first bracket and said branch groove is formed in a second bracket, said first and second brackets being formed separately from the guide rail means.

* * * * *